Oct. 19, 1926.
L. KIRSCHBRAUN
APPARATUS FOR MAKING EMULSIONS
Filed April 9, 1924
1,603,546
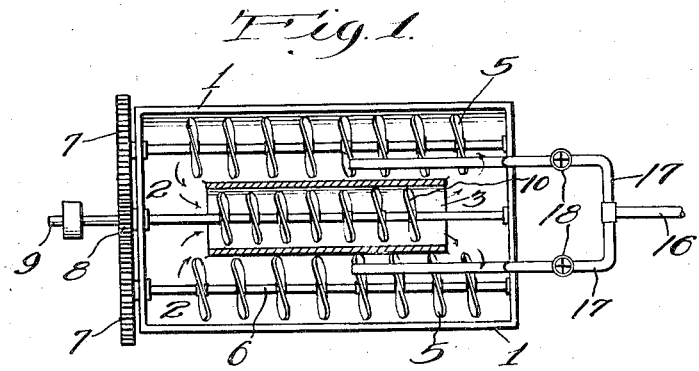
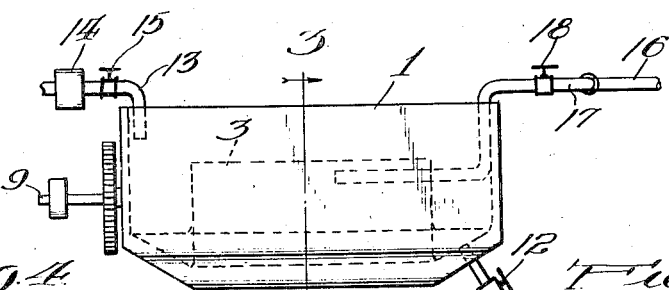
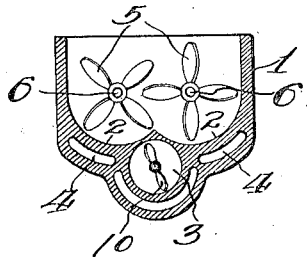
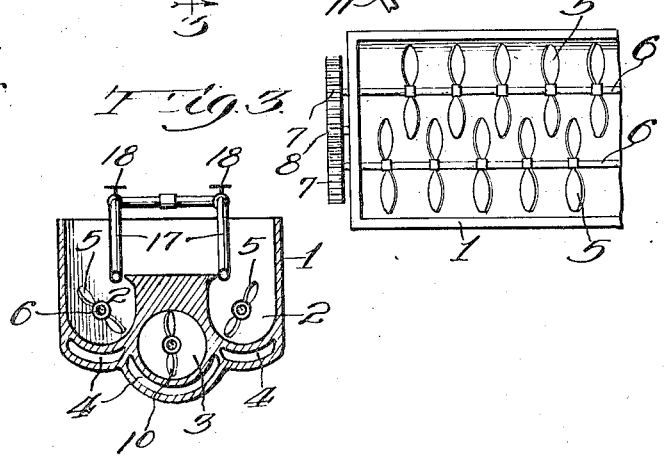
Witness:
Stephen Hibora
Inventor
Lester Kirschbraun
by Frank L. Belknap
Atty.

Patented Oct. 19, 1926.

1,603,546

UNITED STATES PATENT OFFICE.

LESTER KIRSCHBRAUN, OF CHICAGO, ILLINOIS.

APPARATUS FOR MAKING EMULSIONS.

Application filed April 9, 1924. Serial No. 705,372.

This invention relates to improvements in apparatus for making emulsions, and refers more particularly to the mixing of a liquid-repellent material such as bitumen, with an aqueous suspension containing an emulsifying agent.

The specific form of apparatus which it is desired to cover in this application, may comprise an open-topped enlarged circulating chamber disposed in a horizontal plane, preferably provided with an open ended smaller emulsifying chamber and agitating elements, such as fins or paddles mounted on revolving shafts. Separate inlets for the bitumen and suspension may be provided in the preferred form of operation.

The many advantages attributable to my invention will best be understood by describing the process and apparatus shown in the accompanying drawings, in which—

Fig. 1 is a sectional plan view of the emulsifying chamber.

Fig. 2 is a side elevational view of same, with certain parts indicated in dotted lines.

Fig. 3 is a cross sectional view taken on the lines 3—3 of Fig. 2 and looking in the direction of the arrows.

Figs. 4 and 5 are respectively, cross sectional and top plan views of a modified form of construction.

Referring in detail to the drawings, 1 designates as a whole, the shell or enlarged circulating and mixing chamber, in which are contained the trough-like sections 2 and cylindrical emulsifying chamber 3, open-ended preferably and disposed at a lower level than the sections 2. This entire construction is preferably disposed in a horizontal plane, the advantages and purpose of which will be hereinafter explained. The inner emusifying chamber 3 is preferably cylindrical in form, in order that the ingredients passing through the confined area therein will have a circuitous travel, resulting in a complete and thorough dispersion into emulsion. The open ends of the chamber 3 preferably terminate some distance short of the troughs, so that there is free passage at each end for the circulation of material from the troughs to the emulsifying chamber 3, and then around in a cycle, in the direction of the arrows.

The troughs 2 and emulsifying chamber 3 are preferably jacketed as shown at 4, so that either steam or cold water can be introduced as heating or cooling mediums, and the temperature of the mix constantly regulated. The troughs are fitted with conveying agitator blades 5 mounted on the shafts 6 to mix and direct the circulation of the emulsion. The shafts 6 may be rotated by any suitable power and operated in timed relation by the large gears 7, which in turn may mesh with pinion gear 8 mounted on shaft 9, on which latter are mounted the blades or fins 10 rotating in the chamber 3. The various blades and fins shown and described, may, if desired, be arranged spirally around the shafts and there may be any number, the arrangement being such that the circulation is preferably in the direction shown by the arrows. The blades 10 are preferably rotated at a much higher rate of speed than the blades 5.

The emulsifier may be provided with an emulsion draw off 11 controlled by valve 12, inlet pipe 13, meter 14 and valve 15 for the bitumen, such as asphalt, which is preferably fed thereto in heated liquid condition. Through the medium of the meter 14, the amount of bitumen introduced can be accurately controlled at all times. By means of the inlet 16 terminating in extensions 17, each provided with valves 18, the aqueous suspension containing the emulsifying agent may be introduced into the trough-like sections 2. It will be noted that the emulsifying agent in suspension and bitumen, are preferably introduced separately from opposite sides of the mixing tank. The suspension introduced through inlet 16 has been heretofore thoroughly mixed in a suitable mixer, the latter, however, forming the subject of a separate application. The extensions 17 are so arranged as to distribute the suspension over considerable of the length of both mixing troughs 2.

In a batch operation, the required charge of emulsifying agent, such as clay, bentonite, and other argillaceous substances, preferably in colloidal form, may be introduced to trough-like sections 2, water added through the extensions 17 and the mixture agitated until a heavy paste is obtained. The temperature is adjusted to about the melting point of the bitumen used, controlled by steam introduced into the jacket. The bitumen, preferably in heated liquid condition may then be added through pipe 13 and flows with the clay through the restricted area in the chamber 3, where it is dispersed into a very fine emulsion. As it passes out of chamber 3 on its return, water may be added to slightly thin the mixture, which emerges from emulsifier 3 in a very stiff condition. The water is thoroughly and uniformly incorporated in this return circulation, and is in proper condition to meet the stream of asphalt entering as before. The temperature of the emulsion is maintained close to the melting point of the bitumen used. After the desired proportion of asphalt has been incorporated and emulsified, the batch is discharged.

Describing now a continuous operation, a bulk supply of finished emulsion is first established in the apparatus in the manner just described, after which the discharge 11 is opened to continuously withdraw the finished emulsion while fresh bitumen and clay or other emulsifying agent suspended in water, both being properly proportioned, are fed to the mixer through the pipes 17 and 13. The rate of inflow is, of course, regulated to correspond with the rate of withdrawal of finished emulsion.

The invention is particularly directed to handle very stiff and viscous emulsions at less expenditure of power than in the present mixers. The circulation is horizontal, avoiding the lifting action previously required, and enabling the mixture to be kept much stiffer and still circulated. The invention also permits the introduction of clay at a point remote from contact with incoming asphalt and thereby permits of mixing of clay and tempering of the emulsion retained in the mixer prior to reaching the zone of emulsification and point of contact with the bitumen. It also permits the emulsification of a larger proportion of bitumen to clay.

Referring to Figs. 4 and 5, I have shown a modified form of construction in which the mixing blades 5 overlap each other, and the emulsifying chamber 3 is located on a plane below the bottom of the troughs. The purpose of the overlapping blades is to obtain a thorough mixing particularly desirable for use in a heavy viscous mass.

I claim as my invention:

1. In a mixing apparatus, the combination with an enlarged chamber, of an open-ended conduit disposed in a horizontal plane therein, agitating elements in the chamber and in the open-ended conduit and inlets for introducing the materials to be mixed.

2. In an apparatus for producing emulsions, the combination with a horizontally disposed enlarged chamber, of an open-ended conduit disposed horizontally therein, agitating elements in both the chamber and the conduit, the elements in the conduit being disposed in a lower plane than the elements in the enlarged chamber, inlets for introducing emulsifying agent, water and liquid repellant material.

3. In an apparatus for producing emulsions, the combination with a horizontally disposed enlarged chamber, of an open-ended conduit disposed horizontally therein, agitating elements in both the chamber and the conduit, the elements in the conduit being disposed in a lower plane than the elements in the enlarged chamber, inlets for introducing emulsifying agent, water and liquid repellant material, the inlet for the liquid repellant material being located at a point remote from the other inlets.

4. In an apparatus for producing emulsions, the combination with a horizontally disposed enlarged chamber, of an open-ended smaller conduit disposed horizontally therein, agitating elements in the chamber and in the conduit, inlets for introducing emulsifying agent, water and liquid repellant material, and means for controlling the temperature maintained on the material being emulsified.

5. In an apparatus for producing emulsions, the combination with an enlarged horizontally disposed chamber having longitudinal trough-like sections, of a smaller open-ended conduit between the trough-like sections, agitating elements mounted in the trough-like sections and in the conduit, means for introducing the ingredients at points remote from each other.

6. In an apparatus for producing emulsions, the combination with an enlarged horizontally disposed chamber having longitudinal trough-like sections, of a smaller open-ended conduit disposed horizontally between the trough-like sections, agitating elements mounted in the trough-like sections and in the conduit, means for introducing the ingredients at points remote from each other, the apparatus being adapted to impart a horizontal circulation to the materials being emulsified.

LESTER KIRSCHBRAUN.